(12) United States Patent
Lin

(10) Patent No.: US 6,424,551 B1
(45) Date of Patent: Jul. 23, 2002

(54) POWER SUPPLY CONVERTER INCLUDING A RETRACTABLE CONDUCTING WIRE

(76) Inventor: Chung Yu Lin, No 4, Lane 130, Nan-Kang Rd, Sec. 3, Taipei (TW)

( * ) Notice: Subject to any disclaimer, the term of this patent is extended or adjusted under 35 U.S.C. 154(b) by 0 days.

(21) Appl. No.: 09/774,745

(22) Filed: Jan. 30, 2001

(51) Int. Cl.[7] .............................................. H02M 1/00
(52) U.S. Cl. ...................................................... 363/146
(58) Field of Search ................................ 363/142, 144, 363/146; 439/4, 501, 502, 638, 650, 651

(56) References Cited

U.S. PATENT DOCUMENTS

| | | | | |
|---|---|---|---|---|
| 5,306,999 A | * | 4/1994 | Hoffman | 320/2 |
| 5,379,903 A | * | 1/1995 | Smith | 211/13 |
| 5,547,393 A | * | 8/1996 | Jansen | 439/501 |
| 5,593,316 A | * | 1/1997 | Lyons | 439/501 |

* cited by examiner

*Primary Examiner*—Matthew Nguyen
(74) *Attorney, Agent, or Firm*—Pro-Techtor International Services

(57) ABSTRACT

A power supply converter having a retractable conducting wire includes a housing, a wire retracting box mounted in the housing and containing a restoring spring elastic piece therein, and an output conducting wire having a first end connected to the wire retracting box, and a second end connected to an output connector that may be connected to a mobile telephone, a notebook computer, a P.D.A., a digital camera, or the like. In such a manner, the output conducting wire can be wound by the wire retracting box, so that the power supply converter is portable, is easy to store, is easily packaged, and occupies little space.

1 Claim, 4 Drawing Sheets

POWER SUPPLY CONVERTER INCLUDING A RETRACTABLE CONDUCTING WIRE

BACKGROUND OF THE INVENTION

1. Field of the Invention

The present invention relates to a power supply converter having a retractable conducting wire, and more particularly to a power supply converter that may store an elongated conducting wire into a housing of the power supply converter.

2. Description of the Related Prior Art

A conventional power supply converter in accordance with the prior art shown in FIG. 1 is used for a mobile telephone, a notebook computer, a P.D.A., a digital camera, or the like. The conventional power supply converter comprises a body 100 which has a first side provided with a power supply plug 200 that may be inserted into a common receptacle, for supplying power, and a second side connected to a first end of an output conducting wire 300 whose second end is connected to an output connector 400 that can be inserted into a receptacle hole of a mobile telephone, a notebook computer, a P.D.A., a digital camera, or the like, for supplementing power supply or directly supplying the power supply.

However, the elongated output conducting wire 300 cannot be retracted into the body 100 so that it is exposed outward from the body 100 when the conventional power supply converter is not in use. In such a manner, the conventional power supply converter cannot be easily carried, stored, and packaged. Therefore, the user has to use a binding member such as a flexible plastic strip to bind the elongated output conducting wire 300 that has been folded when the conventional power supply converter is not in use, and has to remove the flexible plastic strip from the elongated output conducting wire 300 when the conventional power supply converter is in use, thereby causing inconvenience to the user.

SUMMARY OF THE INVENTION

The present invention has arisen to mitigate and/or obviate the disadvantage of the conventional power supply converter.

The primary objective of the present invention is to provide a power supply converter which can be easily carried, stored, and packaged.

Another objective of the present invention is to provide a power supply converter which occupies little space, thereby greatly reducing the entire volume.

A further objective of the present invention is to provide a power supply converter which is suitable for a mobile telephone, a notebook computer, a P.D.A., a digital camera, or the like.

Accordingly, in accordance with the present invention, there is provided a power supply converter having a retractable conducting wire comprising: a housing; a wire retracting box mounted in the housing and containing a restoring spring elastic piece therein; and an output conducting wire having a first end connected to the wire retracting box, and a second end connected to an output connector that may be connected to a mobile telephone, a notebook computer, a P.D.A., or a digital camera, such that the output conducting wire can be wound by the wire retracting box.

Further benefits and advantages of the present invention will become apparent after a careful reading of the detailed description with appropriate reference to the accompanying drawings.

DETAILED DESCRIPTION OF THE INVENTION

Figure 1:
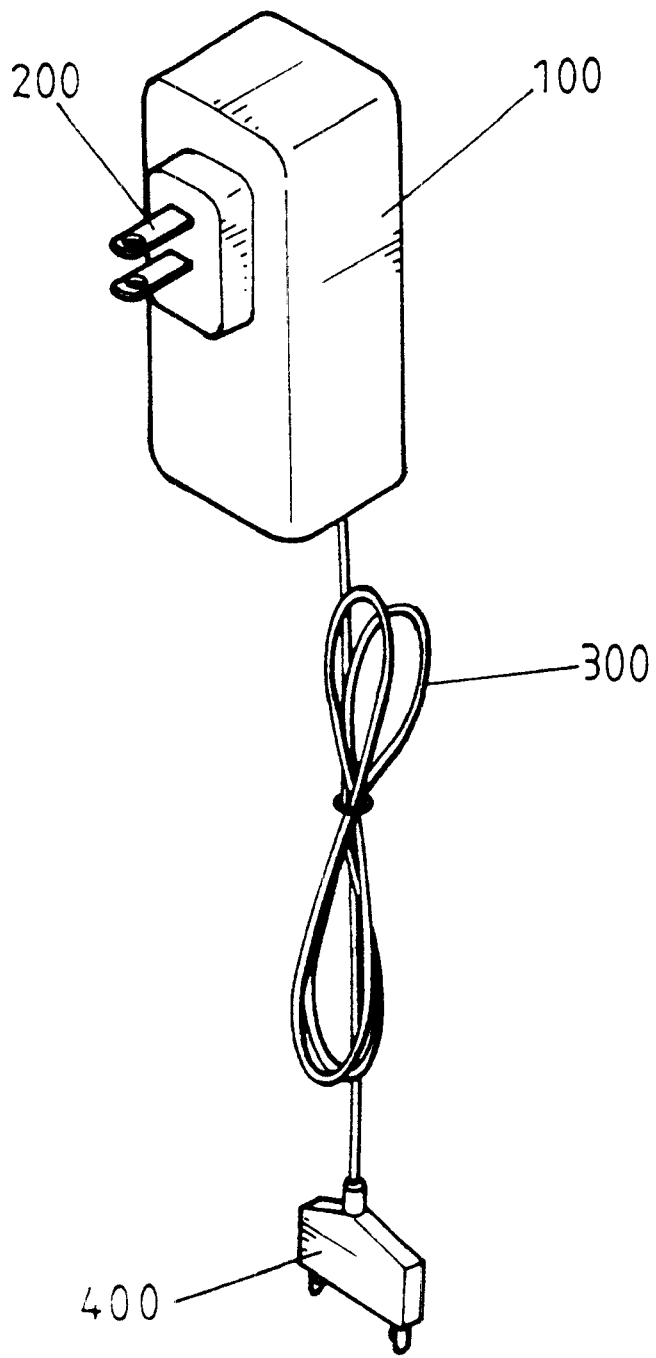
FIG. 1 is a perspective view of a conventional power supply converter in accordance with the prior art.
Figure 2:
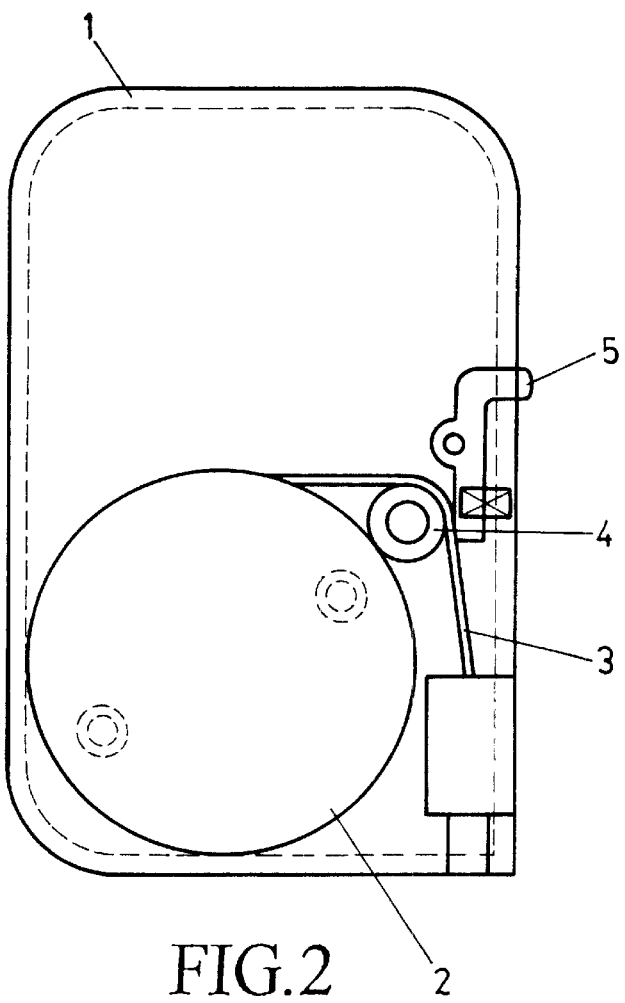
FIG. 2 is a schematic view of an inner structure of a power supply converter having a retractable conducting wire in accordance with the present invention.
Figure 3:
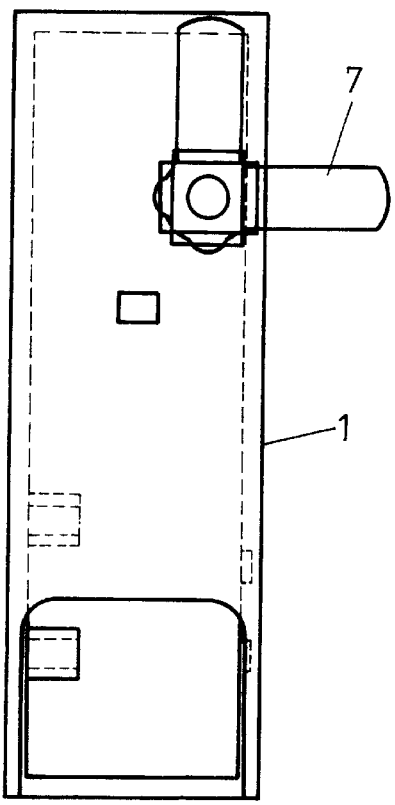
FIG. 3 is a side plan view of the power supply converter having a retractable conducting wire in accordance with the present invention.
Figure 4:
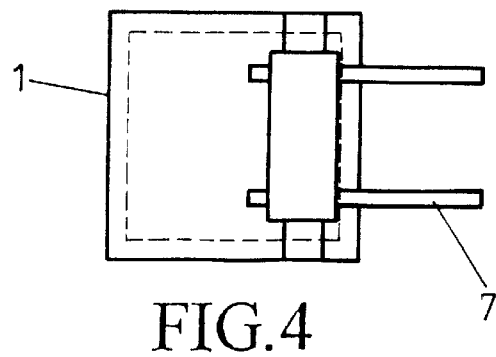
FIG. 4 is a top plan view of the power supply converter having a retractable conducting wire in accordance with the present invention.
Figure 5:
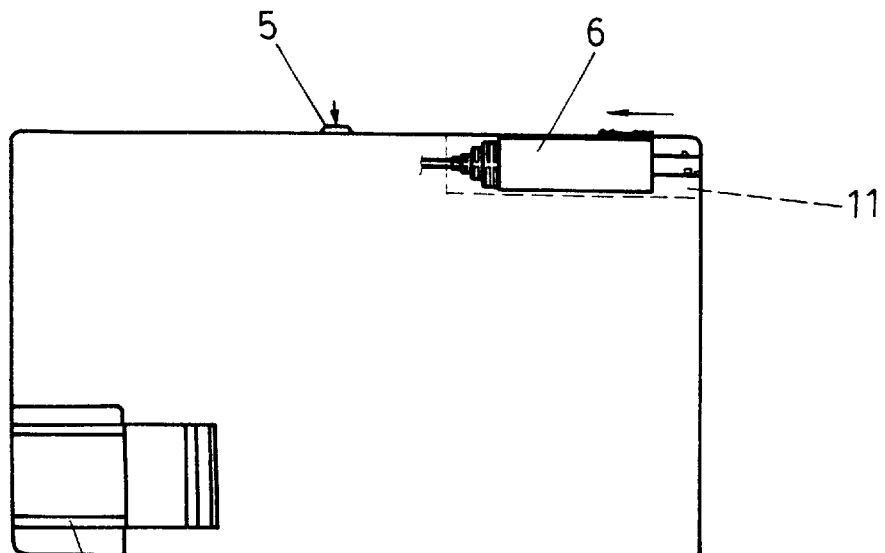
FIG. 5 is a front plan view of the power supply converter having a retractable conducting wire in accordance with the present invention.
Figure 6:
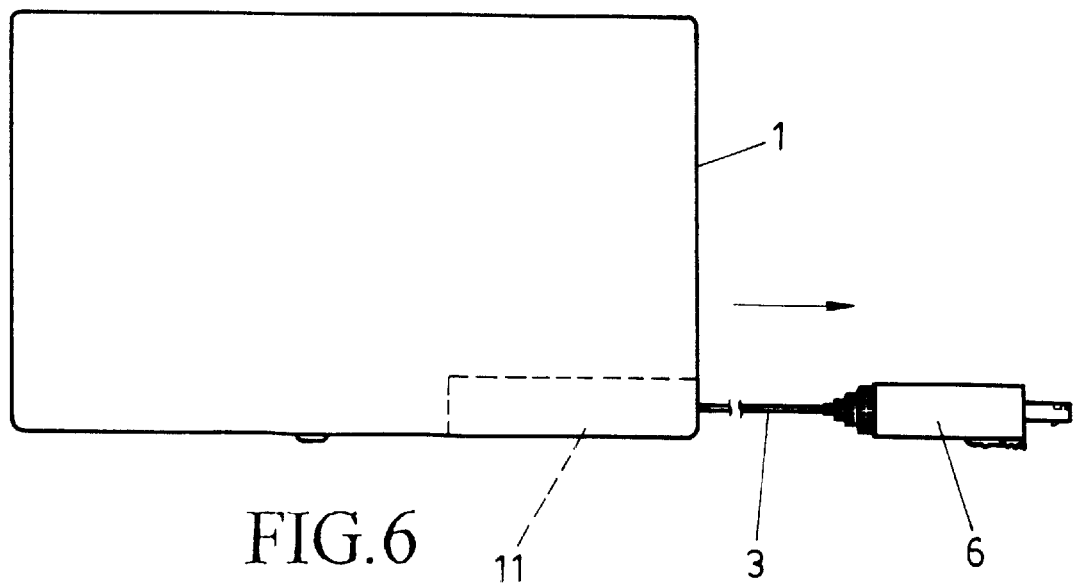
FIG. 6 is a rear plan view of the power supply converter having a retractable conducting wire in accordance with the present invention.

Referring to the drawings and initially to FIGS. 2–4, a power supply converter having a retractable conducting wire in accordance with the present invention comprises a housing 1, a wire retracting box 2 (see FIG. 2) mounted in the housing 1 and containing a retractable restoring spring elastic piece therein, and an output conducting wire 3 having a first end connected to the wire retracting box 2, and a second end connected to an output connector 6 that may be connected to a mobile telephone, a notebook computer, a P.D.A., or a digital camera, such that the output conducting wire 3 can be wound by the wire retracting box 2. The output conducting wire 3 passes through a shaft 4, and is clamped between the inner side of a wire retracting knob 5, whereby the wire retracting knob 5 may be pushed to detach from the shaft 4, thereby releasing the output conducting wire 3, so that the output conducting wire 3 can be retracted or extended.

Referring to FIGS. 5–10, the housing 1 has one side defining a storing recess 11 for receiving and storing the output connector 6 on the second end of the output conducting wire 3. The output connector 6 may be inserted into the receptacle hole of a mobile telephone, a notebook computer, a P.D.A., a digital camera or the like.

Figure 7:
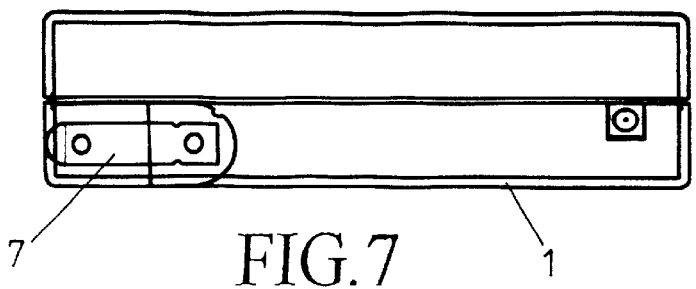
FIG. 7 is a bottom plan view of the power supply converter having a retractable conducting wire in accordance with the present invention.
Figure 8:
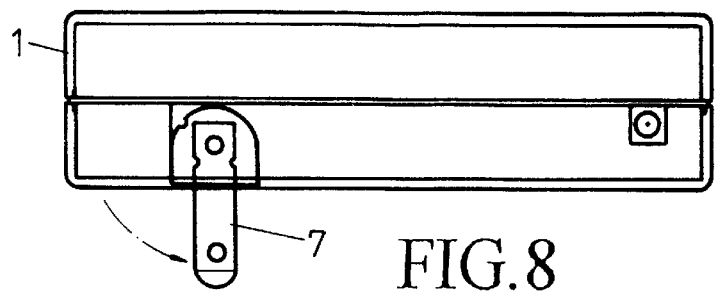
FIG. 8 is a schematic operational view of the power supply converter having a retractable conducting wire as shown in FIG. 7 in use.
Figure 9:
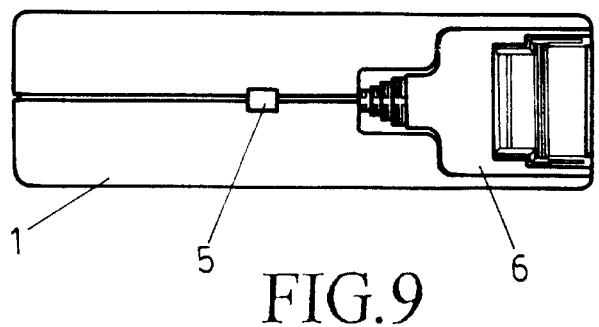
FIG. 9 is a top plan view of the power supply converter having a retractable conducting wire in accordance with the present invention.
Figure 10:
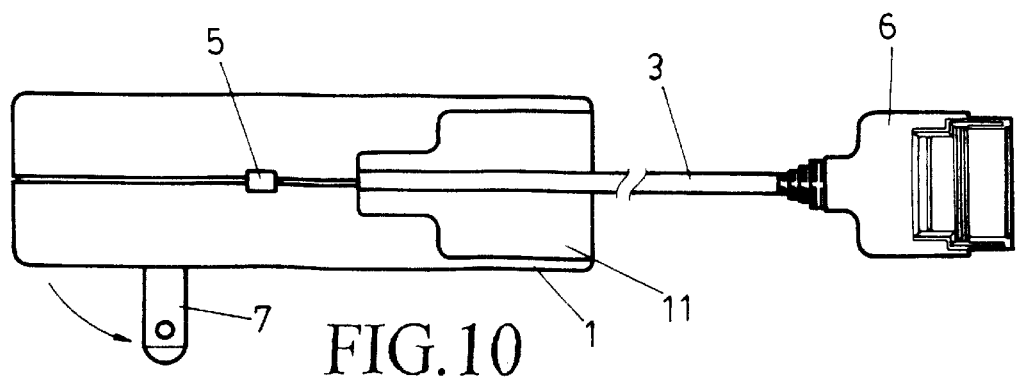
FIG. 10 is an operational view of the power supply converter having a retractable conducting wire as shown in FIG. 9 in use.

In addition, the housing 1 has one side provided with a rotatable power supply plug 7 as shown in FIGS. 7 and 8, which may be inserted into a power supply receptacle for supplying the power supply. The power supply plug 7 is normally hidden in the housing 1. When in use, the power supply plug 7 can be rotated through ninety degrees so as to be inserted into the power supply receptacle.

Accordingly, the power supply converter in accordance with the present invention includes a retractable conducting wire that can be connected to a mobile telephone, a notebook computer, a P.D.A., a digital camera or the like, and can be retracted into and stored in the housing when not is use, so that the power supply converter is easily carried, stored, and packaged without occupying much space.

Although the invention has been explained in relation to its preferred embodiment as mentioned above, it is to be understood that many other possible modifications and variations can be made without departing from the scope of the present invention. It is, therefore, contemplated that the appended claim(s) will cover such modifications and variations that fall within the true scope of the invention.

What is claimed is:

1. A power supply converter having a retractable conducting wire comprising:

a housing, a wire retracting box mounted in said housing and containing a restoring spring elastic piece therein, a shaft, a retracting knob, and an output conducting wire having a first end connected to said wire retracting box, said output connecting wire having a second end connected to an output connector that is received in a DC powered electronic device; wherein said elastic piece in said wire retracting box biases said wire retracting box to provide a winding force that retracts said output connecting wire into said housing, and said retracting knob is pivotally connected to an end piece; so that said end piece of said retracting knob provides pressure on said output connecting wire when said retracting knob is in a secure position, said end piece thereby holding said output connecting wire in a given position, and said end piece of said retracting knob is raised when said retracting knob is moved to a released position, thereby releasing pressure on said output connecting wire so that said output connecting wire is retracted by said wire retracting box into said housing.

* * * * *